(12) United States Patent
Alattar et al.

(10) Patent No.: US 9,470,524 B1
(45) Date of Patent: Oct. 18, 2016

(54) ELECTRONIC ROLL PITCH AND YAW SENSOR USING CONDUCTIVE FLUID

(71) Applicant: International Business Machines Corporation, Armonk, NY (US)

(72) Inventors: Zaid M. Alattar, Tucson, AZ (US); Albert E. Dennes, Tucscon, AZ (US); Ernesto E. Figueroa, Sahuarita, AZ (US); Thomas T. Jesukaitis, Tuscon, AZ (US); Christopher J. Miller, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/978,228

(22) Filed: Dec. 22, 2015

Related U.S. Application Data

(63) Continuation of application No. 14/753,540, filed on Jun. 29, 2015.

(51) Int. Cl.
  *G01C 9/06* (2006.01)
  *G01C 19/14* (2006.01)
  *G01C 23/00* (2006.01)

(52) U.S. Cl.
  CPC ............ *G01C 19/14* (2013.01); *G01C 9/06* (2013.01); *G01C 23/00* (2013.01)

(58) Field of Classification Search
  CPC ........ G01C 19/14; G01C 23/00; G01C 9/06; G01C 2009/062; G01C 2009/063; G01C 2009/068
  USPC .............. 33/366.15, 366.18, 366.19, 366.21, 33/366.22
  See application file for complete search history.

(56) References Cited

U.S. PATENT DOCUMENTS

| | | | | | |
|---|---|---|---|---|---|
| 3,290,786 | A | * | 12/1966 | Parkin ...................... | G01C 9/18 318/489 |
| 4,167,818 | A | * | 9/1979 | Cantarella ................ | G01C 9/20 33/366.14 |
| 4,624,140 | A | * | 11/1986 | Ekchian ................... | G01C 9/20 181/122 |
| 4,672,753 | A | * | 6/1987 | Kent ........................ | G01C 9/20 33/366.19 |

(Continued)

FOREIGN PATENT DOCUMENTS

| | | |
|---|---|---|
| GB | 1219890 | 1/1971 |
| WO | 2008122816 A1 | 10/2008 |

OTHER PUBLICATIONS

Prandi et al., "A Low-Power 3-Axis Digital-Output MEMS Gyroscope with Single Drive and Multiplexed Angular Rate Readout", ISSCC 2011, Session 6, Sensors and Energy Harvesting, 6.1, © 2011 IEEE, pp. 1-3.

(Continued)

*Primary Examiner* — Christopher Fulton
(74) *Attorney, Agent, or Firm* — Gilbert Harmon, Jr.

(57) ABSTRACT

A method and apparatus for determining a rotational orientation of an object is provided. Embodiments of the present invention utilize an electrically conductive fluid enclosed within a shell attached to the object such that the conductive fluid contacts different portions of electrically conductive nodes, located on the inner wall of the shell, depending on the rotational orientation of the shell. The electrically activated nodes in contact with the conductive fluid act as sensors and individually transmit electric signals to a microcontroller for transformation into an indicator of a rotational orientation of the object. The indicator of the rotational orientation is then output.

1 Claim, 6 Drawing Sheets

(56) References Cited

U.S. PATENT DOCUMENTS

| | | | |
|---|---|---|---|
| 5,237,872 A | 8/1993 | Rademakers | |
| 5,625,955 A * | 5/1997 | Han | G01C 9/20 33/366.15 |
| 6,247,239 B1 * | 6/2001 | Shijo | G01C 9/20 33/366.11 |
| 6,249,984 B1 * | 6/2001 | Barsky | G01C 9/06 33/366.15 |
| 6,505,409 B2 * | 1/2003 | Toda | G01C 9/10 33/366.11 |
| 6,904,377 B2 | 6/2005 | Liu et al. | |
| 6,988,321 B2 * | 1/2006 | Ueno | G01C 9/06 33/366.11 |
| 7,055,254 B1 * | 6/2006 | Fabian | G01C 9/06 33/366.11 |
| 8,950,257 B2 | 2/2015 | Cazzaniga et al. | |
| 2010/0088063 A1 | 4/2010 | Laughlin | |
| 2010/0263463 A1 | 10/2010 | Janosik | |
| 2013/0233048 A1 | 9/2013 | Anac et al. | |
| 2015/0059473 A1 | 3/2015 | Jia | |

OTHER PUBLICATIONS

Alattar et al., "Electronic Roll Pitch and Yaw Sensor Using Conductive Fluid", U.S. Appl. No. 14/753,540, filed Jun. 29, 2015, pp. 1-27.

* cited by examiner

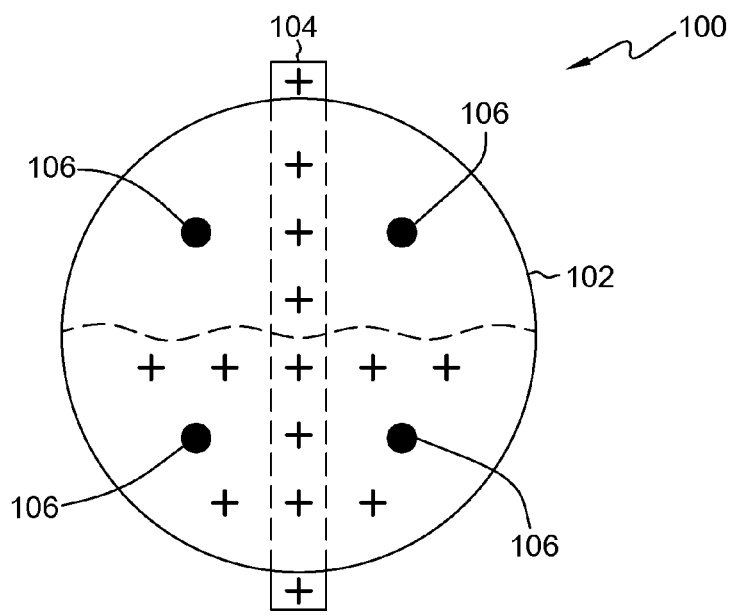
FIG. 1A
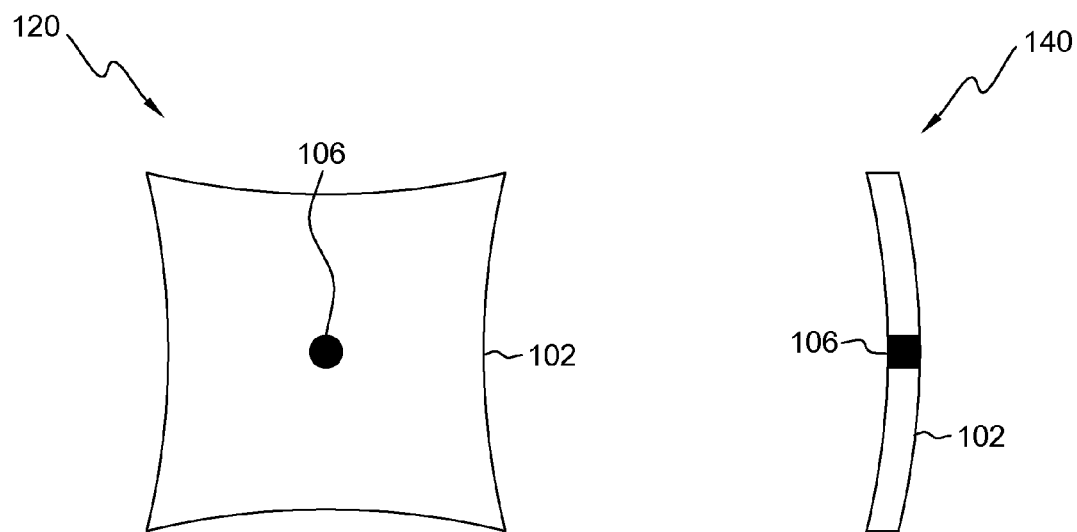
FIG. 1B
FIG. 1C

US 9,470,524 B1

ELECTRONIC ROLL PITCH AND YAW SENSOR USING CONDUCTIVE FLUID

BACKGROUND OF THE INVENTION

The present invention relates generally to the field of navigation systems, and more particularly to determining three-dimensional rotational position in real time.

Navigation systems are generally any combination of systems or devices that are capable of determining an objects current location (relative to another fixed location) and/or rotational position (relative to a reference, non-rotating orientation). This information is highly useful for objects such as, but not limited to aircraft and watercraft (e.g., airplanes, helicopters, ships and submarines) to enable the internal guidance systems to make the necessary adjustments to stay on course to the target destination. Navigation systems are also becoming ubiquitous in many modern electronic and computing devices as well, such as cell phones, tablets and even video game controllers. One very common type of navigation device is a gyroscope, which most generally is a device that will seek to maintain its orientation at all times regardless of how the object that contains it is moving or rotating. Having the constant orientation of the gyroscope as a reference is a practical way of determining the three-dimensional rotational position (that is, x, y and z coordinates for roll, pitch and yaw, respectively) of the object that contains it at any given point in time.

SUMMARY

According to an embodiment, a method for determining a rotational orientation of an object is provided, the method comprising providing a plurality of spherical concentric shells, wherein an electrically conductive shell, connected to one or more power cells disposed within an inner electrically non-conductive shell, is disposed between an outer electrically non-conductive shell and the inner electrically non-conductive shell and one or more electrically non-conductive spacers separate the inner electrically non-conductive shell from the electrically conductive shell, creating a gap; attaching a plurality of electrically conductive nodes to an outer wall of the inner electrically non-conductive shell; disposing an electrically conductive fluid in the gap, wherein the electrically conductive fluid is mercury and is of sufficient volume to ensure that the electrically conductive fluid remains in contact with at least one of the plurality of electrically conductive nodes regardless of a rotational orientation of the plurality of spherical concentric shells; providing, using the one or more power cells, an electrical charge to the electrically conductive shell and a ground connection to each of the plurality of electrically conductive nodes, wherein the one or more power cells are connected to the electrically conductive shell and each of the plurality of electrically conductive nodes by electrically conductive wire; conducting the electrical charge between the electrically conductive shell and a portion of the plurality of electrically conductive nodes in contact with the electrically conductive fluid; transmitting electrical signals individually conducted by each of the portion of the plurality of electrically conductive nodes in contact with the electrically conductive fluid, wherein the electrical signals are transmitted through electrically conductive wire and processed by one or more microcontrollers; generating, using the one or more microcontrollers, an indicator of a rotational orientation of an object, to which the plurality of spherical concentric shells are attached, based on the portion of the plurality of electrically conductive nodes in contact with the electrically conductive fluid; outputting the indicator of the rotational orientation of the object based on at least one of wired and wireless communications; and responsive to a change in the rotational orientation of the object, outputting an associated indicator of the change in the rotational orientation of the object, wherein the associated indicator is based on the change in the rotational orientation of the object causing the electrically conductive fluid to contact a different portion of the plurality of electrically conductive nodes.

BRIEF DESCRIPTION OF THE DRAWINGS

FIG. 1A-C is an exterior perspective view of a spherical apparatus, a partially exploded perspective view of a segment of a sphere, and a partially exploded side elevation view of a segment of a sphere, respectively, in accordance with an embodiment of the present invention;

DETAILED DESCRIPTION

Figure 2A:
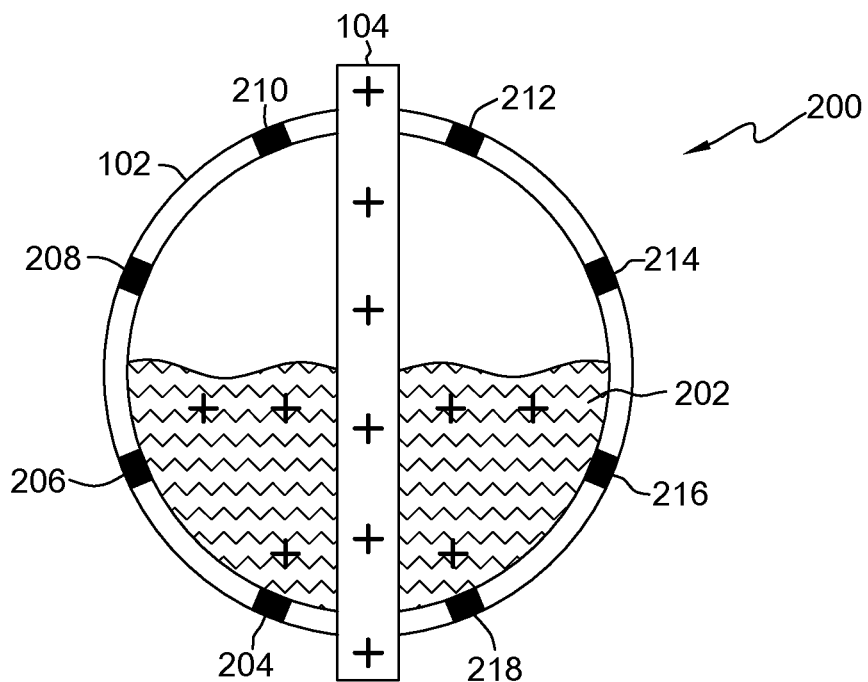
FIG. 2A-B is a cross-sectional view of the interior of a spherical apparatus in a non-rotated, reference orientation and a cross-sectional view of the interior of a spherical apparatus in a rotated non-reference orientation, respectively, in accordance with an embodiment of the present invention.

Embodiments of the present invention disclosed herein recognize that there is a need for effective and accurate navigation systems that, in order to perform their intended function, do not rely on delicate components that must constantly be in motion, making these components subject to inevitable mechanical degradation and breakdown. The failure of these mechanical components can lead to faulty, inaccurate readings or total inoperability of the navigation system. Embodiments of the present invention can be utilized to avoid this problem in that there is no need for delicate mechanical parts that must constantly be in motion for the apparatus to serve its intended function.

Embodiments of the present invention will now be described in detail with reference to the accompanying figures. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, and elements and features can have different dimensions than those depicted in the figures. Therefore, specific structural and functional details disclosed herein are not to be interpreted as limiting, but merely as a representative basis for teaching one skilled in the art to variously employ the present invention.

References in the specification to "an exemplary embodiment," and "other embodiments," etc., indicate that the embodiment described may include a particular feature, structure or characteristic, but every embodiment may not necessarily include the particular feature, structure or characteristic. Further, when a particular feature, structure, or characteristic is described in connection with an embodiment, it is submitted that it is within the knowledge of one skilled in the art to affect such feature, structure or characteristic in connection with other embodiments whether or not specifically described.

FIG. 1A is a perspective diagram of a spherical apparatus 100 in accordance with an embodiment of the present invention. A three-dimensional hollow sphere made of an electrically non-conductive material 102 has an electrically conductive, positively charged (indicated by the + signs) cylindrical rod 104 affixed to it, the conductive rod 104 passing through the interior of non-conductive sphere 102 diametrically and protruding from both ends of the sphere. In other embodiments, conductive rod 104 can be shapes other than cylindrical, such as rectangular for example and can be negatively charged, so long as it is conducting an electrical charge. Further, the ends of conductive rod 104 need not protrude outside non-conductive sphere 102. In general, a plurality of electrically conductive nodes 106 are embedded in or attached to the inner wall of non-conductive sphere 102 and are substantially equally distributed spatially around the inner wall. Additionally, the shape of the apparatus need not be spherical but can be other shapes, in accordance with various embodiments of the present invention.

Looking to FIG. 1B, a partially exploded perspective view 120 of a segment of non-conductive sphere 102 with a conductive node 106 embedded in the center is depicted for close-up detail. Further, FIG. 1C depicts a partially exploded side view 140 of a segment of non-conductive sphere 102 such that the thickness of both non-conductive sphere 102 and conductive node 106 are now visible, in accordance with an embodiment of the present invention. It should be noted in the embodiments described herein that the electrical conductivity associated with each conductive node extends through the wall of the sphere.

FIG. 2A depicts an interior, cross-sectional view of a spherical apparatus 200 in accordance with an embodiment of the present invention. Enclosed within non-conductive sphere 102 is a conductive fluid 202, such as mercury for example, present in such a volume as to ensure that it is always in contact with conductive rod 104 regardless of the spatial orientation of non-conductive sphere 102, so that conductive fluid 202 is conducting an electric charge (indicated by the + signs in conductive fluid 202). It should be noted in the embodiments that conductive fluid 202 can be any electrically conductive fluid with such a viscosity and cohesiveness to minimize splashing and to prevent it from beading up in multiple areas of the interior of non-conductive sphere 102 or sheeting on the inner sphere wall, causing an inaccurate reading. Further, it is to be understood that in accordance with other embodiments of the invention, conductive rod 104 is not required to span the entire diameter of non-conductive sphere 102, but can be shortened so that it is only affixed to non-conductive sphere 102 at one end, so long as conductive rod 104 is always in contact with the chosen volume of conductive fluid 202 enclosed in non-conductive sphere 102. In other embodiments, conductive rod 104 can be aligned so that it does not pass through the geometric center of the non-conductive sphere 102 along a diameter, again as long as constant contact of conductive rod 104 with the chosen volume of conductive fluid 202 is ensured.

In accordance with an embodiment of the present invention, the cross-sectional view of spherical apparatus 200 depicts eight individually numbered, embedded electrically conductive nodes 204, 206, 208, 210, 212, 214, 216, 218 that are visible in the wall of non-conductive sphere 102. In general, any plurality of electrically conductive nodes can be present on non-conductive sphere 102 wherein a greater number of nodes provides a greater resolution of rotational movement of non-conductive sphere 102, in accordance with various embodiments of the invention. As non-conductive sphere 102 is pitched, rolled and/or yawed, the contained conductive fluid 202 will seek to level out under the influence of gravitational forces and maintain its position with respect to the gravitational direction. This ensures that the charged, conductive fluid 202 will remain in contact with different conductive nodes depending on non-conductive sphere's 102 rotational position. As discussed later in this specification, implementations of embodiments of the present invention utilize the portion of the conductive nodes conducting a charge (due to their contact with the charged, conductive fluid) in order for a rotational position (roll, pitch and yaw coordinates) to be determined at any given point in time. It is therefore understood that the interior of non-conductive sphere 102 must not be completely filled with conductive fluid 202, otherwise conductive fluid 202 would contact every conductive node simultaneously thus prohibiting the determination of changing rotational positions. It should be further noted that a rotation of non-conductive sphere 102 exclusively about the yaw axis (that is, the rotational axis parallel to the force of gravity) will not be detected by the present invention due to the fact that the same portion of the plurality of nodes will remain activated throughout the duration of such a rotation. This is not the case for a rotation exclusively about the roll axis or the pitch axis, both of which can be detected by embodiments of the present invention. It is only when a yaw rotation is combined with a roll and/or a pitch rotation that the apparatus will be able to detect a change in the yaw rotational position.

Figure 2B:
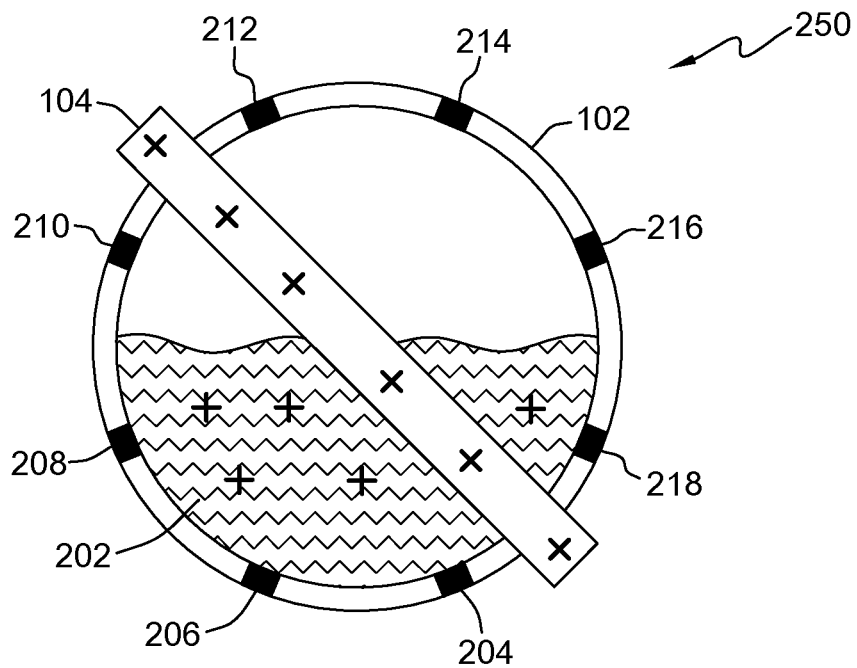

In FIG. 2B, the cross-sectional view of spherical apparatus 250 depicts a counterclockwise rotation with respect to spherical apparatus 200. Spherical apparatuses 200 and 250 are the same object in different orientations in accordance with an embodiment of the present invention, wherein the only difference between the two is the aforementioned rotation. The rotational state of spherical apparatus 200 is noted as the "reference orientation" wherein conductive fluid 202 is in contact with a portion of the nodes 204, 206, 216 and 218. Now turning to spherical apparatus 250, it is shown that conductive fluid 202 is in contact with a different portion of the nodes 204, 206, 208 and 218. This difference in rotational position allows the conductive fluid 202 to be in electrical contact with (and thereby activating) different combinations of nodes on the inner wall of non-conductive sphere 102 and the associated determination of a different orientation with respect to spherical apparatus 200.

Figure 3A:
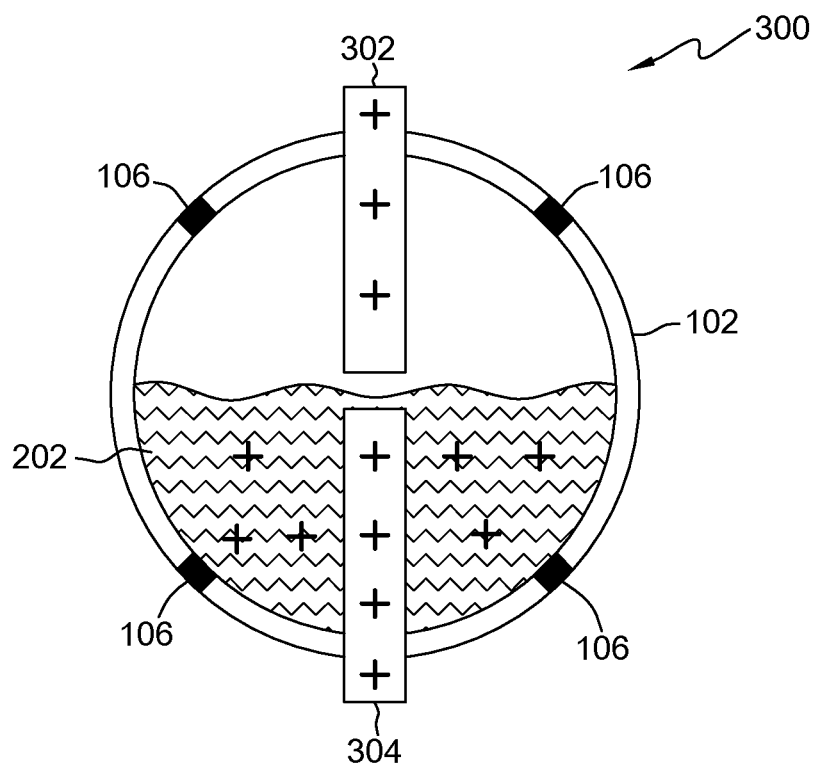
FIG. 3A-B is an interior cross-sectional view of a spherical apparatus with two separate conductive rods and an interior cross-sectional view of a spherical apparatus with 5 separate conductive rods, respectively, in accordance with an embodiment of the present invention.
Figure 3B:
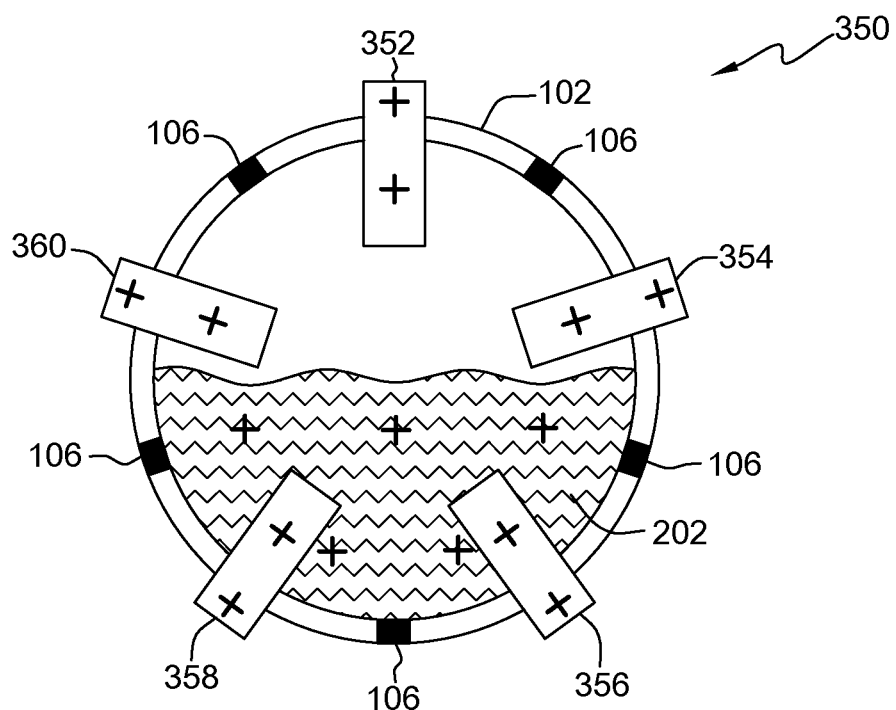

Turning now to FIG. 3A and FIG. 3B, diagrams 300 and 350 depict cross-sectional views of multi-rod configurations of embodiments of the spherical apparatus. In diagram 300, two positively charged electrically conductive rods 302, 304 charge the present volume of conductive fluid 202 enclosed within non-conductive sphere 102, in accordance with an embodiment of the present invention. Diagram 350 depicts another embodiment of the invention, one that has five positively charged conductive rods labeled 352, 354, 356, 358 and 360. In general, any number of charged, electrically conductive rods can be utilized in the spherical apparatus so long as conductive fluid 202 is always in contact with at least one of the rods, in accordance with various embodiments of the present invention. It should further be noted in the embodiment that a greater number of charged rods allows for the use of a smaller amount of conductive fluid 202 based on the smaller distance between charged rods.

Figure 4A:
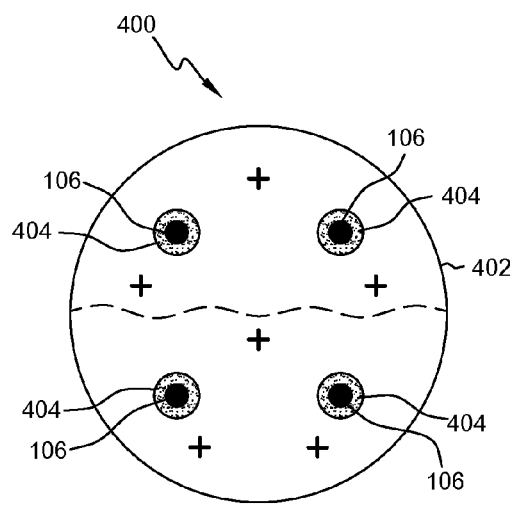
FIG. 4A-D is an exterior perspective view of a spherical apparatus, an interior cross-sectional view of a spherical apparatus, a partially exploded perspective view of a segment of a spherical apparatus and a partially exploded side elevation view of the spherical apparatus, in accordance with an embodiment of the present invention.

FIG. 4A illustrates a perspective view of another embodiment of the present invention. Spherical apparatus 400 presents an exterior perspective view of a three-dimensional, hollow, electrically conductive sphere 402 that is carrying a positive charge (represented by the + signs on the sphere). It is to be understood that in accordance with other embodiments of the invention, the charge on the sphere can be negative. A plurality of conductive nodes 106 are embedded in or attached to the inner wall of conductive sphere 402, however, the conductive nodes 106 are surrounded by a ring of electrically insulating material 404, i.e., the nodes are not making electrical contact with conductive sphere 402.

Figure 4C:
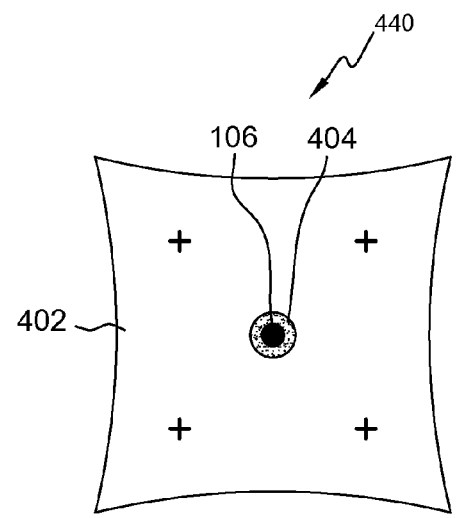
Figure 4B:
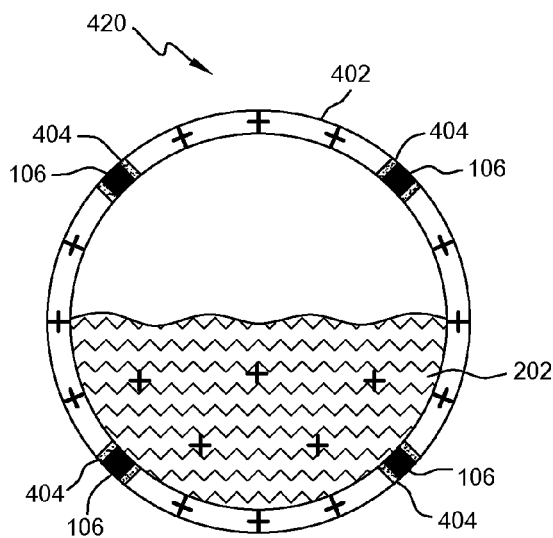

FIG. 4B is a depiction of an interior cross-sectional view of spherical apparatus 420 such that the wall of the hollow, conductive sphere 402, the conductive nodes 106 and the insulators 404 are visible, in accordance with an embodiment of the present invention. Spherical apparatus 420 shows a volume of conductive fluid 202 enclosed within the conductive sphere 402. Conductive fluid 202 is here depicted as carrying a positive charge (indicated by the + sign) based on contact with conductive sphere 402. As previously described, different combinations of the plurality of conductive nodes 106 will either be activated or not activated (conducting a charge or not) depending on whether or not they are in contact with conductive fluid 202. The position of conductive fluid 202 and thus contact with various nodes depends on the rotational orientation of the spherical apparatus.

Figure 4D:
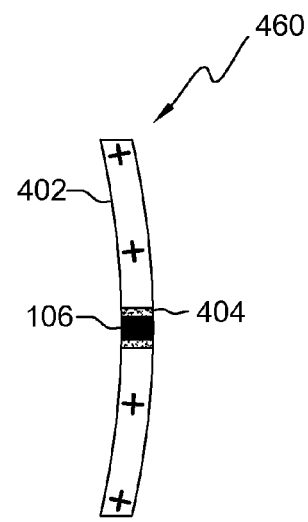

In FIG. 4C, diagram 440 illustrates a partially exploded perspective view of a segment of conductive sphere 402 for close up detail. Conductive sphere 402 carries a positive charge in accordance with an embodiment of the present invention, and conductive node 106 is surrounded by insulator 404 embedded into conductive sphere 402. Diagram 460 in FIG. 4D depicts a partially exploded side view of a segment of conductive sphere 402 with a conductive node 106 surrounded by an insulator 404 embedded in the sphere.

Figure 5:
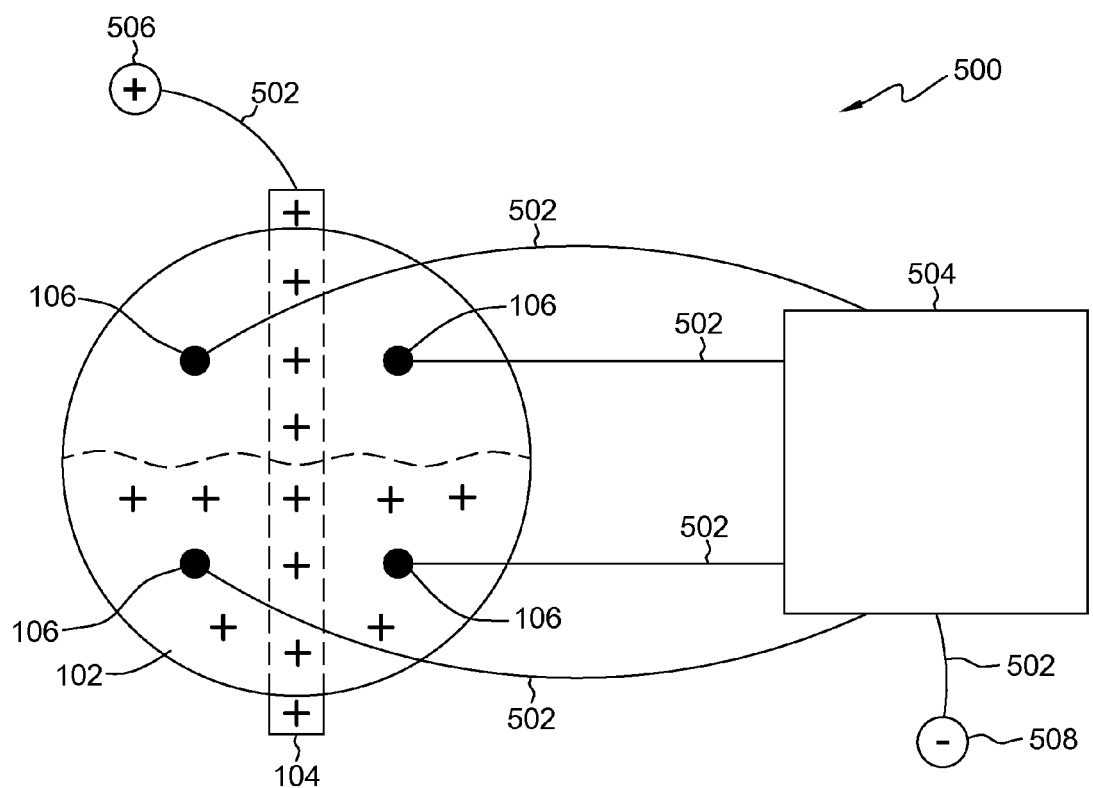
FIG. 5 depicts an exterior perspective view of the spherical apparatus wired to a voltage source and a microcontroller, in accordance with an implementation of an embodiment of the present invention.

Diagram 500 in FIG. 5 is a perspective view of an implementation of an embodiment of the present invention. Diagram 500 illustrates non-conductive sphere 102 embedded with a plurality of conductive nodes 106 and a conductive rod 104 affixed to the sphere, passing through the sphere diametrically in accordance with an embodiment of the invention. Conductive rod 104 is connected by an electrically conductive wire 502 to a power source 506 that is passing an electrical charge to conductive rod 104. The conductive nodes 106 are connected by conductive wires 502 to a microcontroller 504 that can independently detect which nodes are electrically activated and then transform the detected electrically activated nodes to a rotational orientation for the apparatus relative to a predetermined reference orientation. The volume of conductive fluid enclosed within the sphere is depicted with a dashed line inside the sphere and it is this charged conductive fluid that is activating the various combinations of the plurality of conductive nodes 106 as previously described, in accordance with an embodiment of the present invention. Additionally, microcontroller 504 is connected by conductive wire 502 to an electrical ground 508 in the exemplary embodiment.

Figure 6:
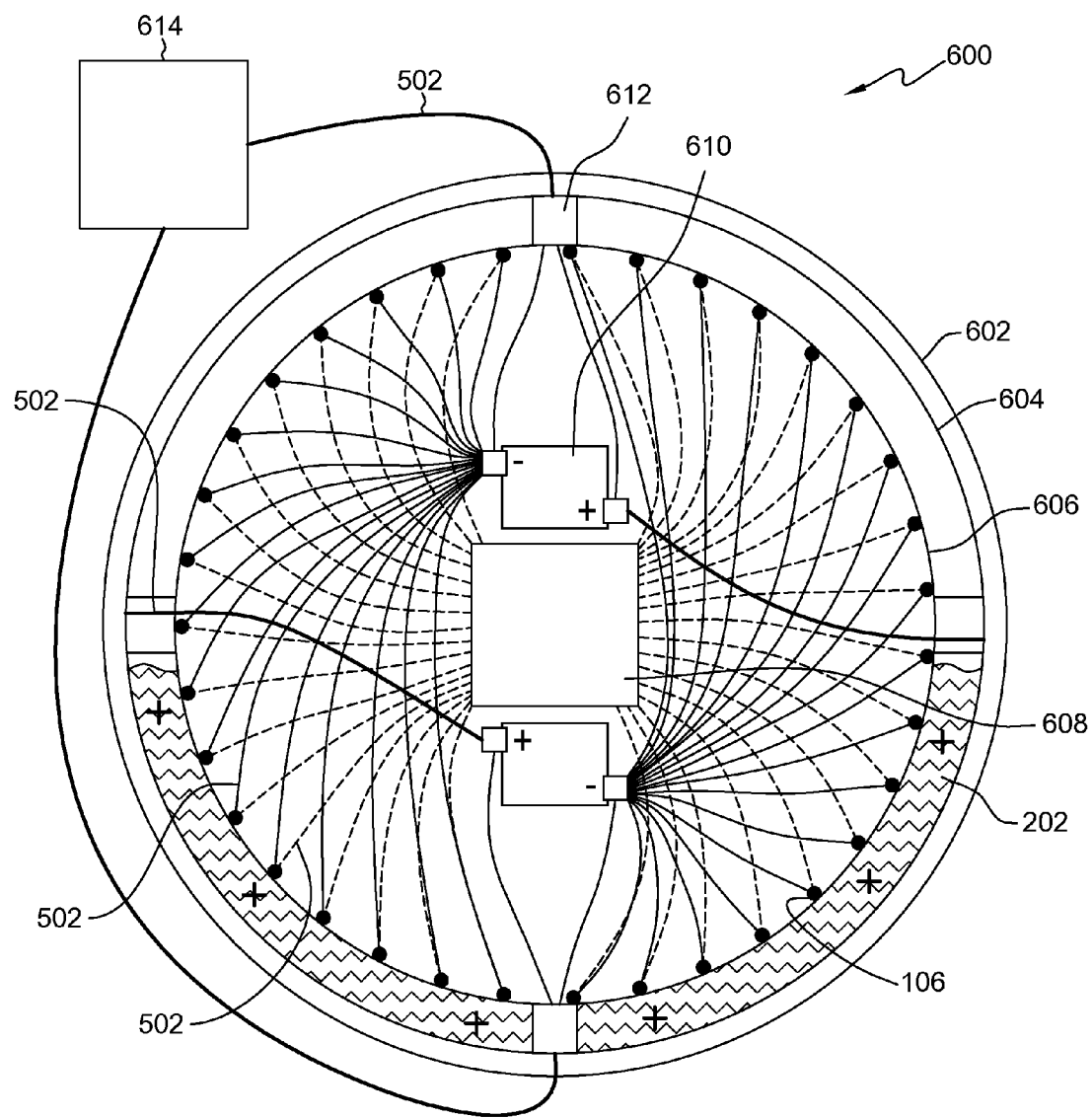
FIG. 6 illustrates an interior cross-sectional view of an alternate implementation of the spherical apparatus, having rechargeable power sources and a microcontroller contained within, the rechargeable power sources being wired to an external recharging source, in accordance with an embodiment of the present invention.

Diagram 600 in FIG. 6 is an interior, cross-sectional view of an implementation of an embodiment of the present invention, utilized for the purpose of determining a rotational position in real time. The device illustrated in diagram 600 operates similarly to the implementation described in FIG. 5 except that there are one or more power sources and microcontrollers within an innermost spherical shell of a plurality of concentric spherical shells. It should be noted that the term "spherical shell" can be used interchangeably with the term "hollow sphere." In diagram 600, a hollow, electrically conductive sphere 604 is attached to the interior surface of a hollow, outer non-conductive sphere 602. It should be noted that outer non-conductive sphere 602 can be a non-conductive coating applied to the outer wall of conductive sphere 604, in accordance with various embodiments of the present invention. Within conductive sphere 604 there is a hollow, inner electrically non-conductive sphere 606 of a lesser radius than conductive sphere 604, held in place such that there is a uniform width gap between conductive sphere 604 and inner non-conductive sphere 606. This gap is maintained by one or more electrically non-conductive hollow spacers 612 spanning the gap between conductive sphere 604 and inner non-conductive sphere 606. It should be noted that the electrically non-conductive spacers 612 can be an extension of either inner non-conductive sphere 606 and/or outer non-conductive sphere 602. It should be further noted that the spacers 612 can be openings for recharge ports (which will be discussed later in this specification) and conductive wire 502 in accordance with various embodiments of the present invention.

A conductive fluid 202 is enclosed within the gap between the conductive sphere 604 and the inner non-conductive sphere 606, free to move in response to gravitational forces due to the rotation of the apparatus. This conductive fluid 202 enclosed within the gap will flow around the aforementioned spacers 612 such that it cannot enter the interior of inner non-conductive sphere 606 or exit outside of the outer non-conductive sphere 602. Embedded in or attached to the inner wall of inner non-conductive sphere 606 will be a plurality of conductive nodes 106 that will act as sensors when in contact with conductive fluid 202, as previously described herein. Therefore, the chosen volume of conductive fluid 202 in the gap must be of sufficient volume to always be in contact with at least one of the conductive nodes 106 embedded in or attached to non-conductive sphere 606.

Within the interior of non-conductive sphere 606 there are one or more rechargeable power cells 610 and one or more microcontrollers 608 having wired and/or wireless communication capabilities, such as, but not limited to, Bluetooth. The communication capabilities of the one or more microcontrollers 608 provide for communicating with a central host or with other similar devices, in accordance with various embodiments of the present invention. Each of the plurality of conductive nodes 106 found in or on inner non-conductive sphere 606 can be connected to a terminal of at least one of the one or more rechargeable power cells 610 by an electrically conductive wire 502 (represented as a solid line within inner non-conductive sphere 606) as a ground connection. The one or more rechargeable power cells 610 will in turn be connected on the other terminal (that is not directly wired to the conductive nodes 106) to the conductive sphere 604 by conductive wire 502 (again represented by a solid black line within inner non-conductive sphere 606) via the spacer 612 openings in the gap between the inner non-conductive sphere 606 and the conductive sphere 604 as previously described. Both terminals of the one or more rechargeable power cells 610 can be connected to at least one of the one or more recharge ports that can be located in the spacer 612 openings. Each of the one or more recharge ports can be connected by conductive wire 502 to an external recharging peripheral 614 located outside of the outer non-conductive sphere 602, in accordance with an embodiment of the present invention. In this way, the one or more rechargeable power cells 610 located within the inner non-conductive sphere 606 can operate continuously, recharging as required.

Each of the plurality of conductive nodes 106 in diagram 600 are connected by conductive wire 502 (represented as a dashed line) to at least one of the one or more microcontrollers 608 located in the interior of inner non-conductive sphere 606, in the exemplary embodiment. In general, there may be a plurality of microcontrollers 608 in any particular embodiment of the invention and the plurality of microcontrollers 608 can have wireless capabilities for the purpose of communicating information relating to the rotational orientation of the device. The one or more microcontrollers 608 have both input and output capabilities as well as processing and logic functionality so that they can receive electrical signals from the plurality of conductive nodes 106, make a determination about what combination of nodes are electrically active, transform the portion conductive nodes 106 that are electrically active into a rotational state and output an indicator of the rotational state to a central host or to one or more other similar devices. It should be noted in the embodiment that the indicator of the rotational state can be communicated by either a wired or a wireless communication.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a rotational orientation of an object, the method comprising:

providing a plurality of spherical concentric shells, wherein an electrically conductive shell, connected to one or more power cells disposed within an inner electrically non-conductive shell, is disposed between an outer electrically non-conductive shell and the inner electrically non-conductive shell and one or more electrically non-conductive spacers separate the inner electrically non-conductive shell from the electrically conductive shell, creating a gap;

attaching a plurality of electrically conductive nodes to an outer wall of the inner electrically non-conductive shell;

disposing an electrically conductive fluid in the gap, wherein the electrically conductive fluid is mercury and is of sufficient volume to ensure that the electrically conductive fluid remains in contact with at least one of the plurality of electrically conductive nodes regardless of a rotational orientation of the plurality of spherical concentric shells;

providing, using the one or more power cells, an electrical charge to the electrically conductive shell and a ground connection to each of the plurality of electrically conductive nodes, wherein the one or more power cells are connected to the electrically conductive shell and each of the plurality of electrically conductive nodes by electrically conductive wire;

conducting the electrical charge between the electrically conductive shell and a portion of the plurality of electrically conductive nodes in contact with the electrically conductive fluid;

transmitting electrical signals individually conducted by each of the portion of the plurality of electrically conductive nodes in contact with the electrically conductive fluid, wherein the electrical signals are transmitted through electrically conductive wire and processed by one or more microcontrollers;

generating, using the one or more microcontrollers, an indicator of a rotational orientation of an object, to which the plurality of spherical concentric shells are attached, based on the portion of the plurality of electrically conductive nodes in contact with the electrically conductive fluid;

outputting the indicator of the rotational orientation of the object based on at least one of wired and wireless communications; and responsive to a change in the rotational orientation of the object, outputting an associated indicator of the change in the rotational orientation of the object, wherein the associated indicator is based on the change in the rotational orientation of the object causing the electrically conductive fluid to contact a different portion of the plurality of electrically conductive nodes.

* * * * *